(12) United States Patent
Seki

(10) Patent No.: US 9,075,403 B2
(45) Date of Patent: Jul. 7, 2015

(54) ESTIMATION APPARATUS FOR CONTROL SYSTEM AND METHOD THEREFOR

(75) Inventor: Tatsuru Seki, Tachikawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 568 days.

(21) Appl. No.: 13/421,973

(22) Filed: Mar. 16, 2012

(65) Prior Publication Data

US 2012/0271438 A1 Oct. 25, 2012

(30) Foreign Application Priority Data

Apr. 19, 2011 (JP) ................................. 2011-093511

(51) Int. Cl.
*G05B 13/02* (2006.01)

(52) U.S. Cl.
CPC ..................... *G05B 13/02* (2013.01)

(58) Field of Classification Search
USPC ................. 700/37; 382/103; 702/92
See application file for complete search history.

(56) References Cited

U.S. PATENT DOCUMENTS

| | | | |
|---|---|---|---|
| 2006/0038710 A1* | 2/2006 | Staszewski et al. | 341/143 |
| 2006/0187571 A1* | 8/2006 | Kim et al. | 360/77.02 |
| 2007/0076822 A1* | 4/2007 | Miller et al. | 375/327 |
| 2007/0124090 A1* | 5/2007 | Henry et al. | 702/45 |
| 2007/0150106 A1* | 6/2007 | Hashimoto et al. | 700/245 |
| 2007/0196029 A1* | 8/2007 | Kondo et al. | 382/274 |
| 2008/0053240 A1* | 3/2008 | Henry et al. | 73/861.04 |
| 2009/0252009 A1* | 10/2009 | Kubota et al. | 369/53.3 |
| 2010/0063763 A1* | 3/2010 | Rozelle | 702/92 |
| 2010/0199237 A1* | 8/2010 | Kim et al. | 716/3 |
| 2010/0211200 A1* | 8/2010 | Kobayashi | 700/94 |
| 2010/0246842 A1* | 9/2010 | Kobayashi | 381/61 |
| 2010/0246886 A1* | 9/2010 | Nakamura et al. | 382/103 |
| 2010/0310125 A1* | 12/2010 | Hsieh et al. | 382/103 |

FOREIGN PATENT DOCUMENTS

JP  3219245 B  10/2001

* cited by examiner

*Primary Examiner* — Robert Fennema
*Assistant Examiner* — Anthony Whittington
(74) *Attorney, Agent, or Firm* — Carter, DeLuca, Farrell & Schmidt, LLP

(57) ABSTRACT

The frequency characteristic of a controller is acquired. The gain characteristic and phase characteristic of a controlled system are acquired. The open-loop transfer characteristic of the control system and the variation range of the open-loop transfer characteristic are computed from a variation range of the frequency characteristic of the controlled system and the frequency characteristic of the controller, and the variation range of the frequency characteristic of the controlled system is a region where a variation range of the gain characteristic and a variation range of the phase characteristic overlap in a complex coordinate system. The stability of the control system is estimated from the open-loop transfer characteristic and the variation range of the open-loop transfer characteristic.

7 Claims, 9 Drawing Sheets

FIG. 4

| FREQUENCY [Hz] | GAIN[dB] | PHASE DIFFERENCE [deg] |
|---|---|---|
| 1 | −3 | −150 |
| 2 | −13 | −127 |
| 3 | −18 | −111 |
| 5 | −23 | −89 |
| 7 | −26 | −76 |
| 10 | −28 | −62 |
| 20 | −30 | −41 |
| 30 | −31 | −34 |
| 50 | −31 | −33 |
| 70 | −31 | −36 |
| 100 | −31 | −45 |

FIG. 5

| FREQUENCY [Hz] | GAIN[dB] | | PHASE DIFFERENCE[deg] | |
|---|---|---|---|---|
| | MAXIMUM | MINIMUM | MAXIMUM | MINIMUM |
| 1 | 48 | 25 | 0 | −64 |
| 2 | 43 | 25 | 0 | −77 |
| 3 | 40 | 27 | 0 | −82 |
| 5 | 35 | 31 | −10 | −86 |
| 7 | 36 | 33 | −45 | −89 |
| 10 | 31 | 30 | −80 | −91 |
| 20 | 24 | 24 | −98 | −98 |
| 30 | 21 | 21 | −104 | −104 |
| 50 | 20 | 20 | −128 | −128 |
| 70 | 18 | 18 | −186 | −186 |
| 100 | 7 | 7 | −237 | −237 |

| FREQUENCY | GAIN[dB] | | PHASE DIFFERENCE[deg] | | SEARCH RESULT |
| [Hz] | MAXIMUM | MINIMUM | MAXIMUM | MINIMUM | |
|---|---|---|---|---|---|
| 1 | 45 | 22 | −150 | −214 | 1 |
| 2 | 30 | 12 | −127 | −204 | 1 |
| 3 | 22 | 9 | −111 | −193 | 1 |
| 5 | 12 | 8 | −99 | −175 | 0 |
| 7 | 10 | 7 | −121 | −165 | 0 |
| 10 | 3 | 2 | −142 | −153 | 0 |
| 20 | −6 | −6 | −139 | −139 | 0 |
| 30 | −10 | −10 | −138 | −138 | 0 |
| 50 | −11 | −11 | −161 | −161 | 1 |
| 70 | −13 | −13 | −222 | −222 | 0 |
| 100 | −24 | −24 | −282 | −282 | 0 |

| FREQUENCY [Hz] | LONGEST DISTANCE | SHORTEST DISTANCE |
|---|---|---|
| 1 | 180.9 | 11.3 |
| 2 | 30.3 | 2.8 |
| 3 | 11.6 | 1.8 |
| 5 | 4.1 | 1.5 |
| 7 | 2.9 | 1.3 |
| 10 | 0.9 | 0.6 |
| 20 | 0.7 | 0.7 |
| 30 | 0.8 | 0.8 |
| 50 | 0.7 | 0.7 |
| 70 | 0.8 | 0.8 |
| 100 | 1.0 | 1.0 |

F I G. 10

| FREQUENCY [Hz] | DISTURBANCE SENSITIVITY | |
|---|---|---|
| | BEST VALUE | WORST VALUE |
| 1 | 0.01 | 0.09 |
| 2 | 0.03 | 0.35 |
| 3 | 0.09 | 0.57 |
| 5 | 0.25 | 0.68 |
| 7 | 0.34 | 0.79 |
| 10 | 1.10 | 1.78 |
| 20 | 1.42 | 1.42 |
| 30 | 1.28 | 1.28 |
| 50 | 1.36 | 1.36 |
| 70 | 1.18 | 1.18 |
| 100 | 0.99 | 0.99 |

ESTIMATION APPARATUS FOR CONTROL SYSTEM AND METHOD THEREFOR

BACKGROUND OF THE INVENTION

1. Field of the Invention

The present invention relates to an estimation apparatus for supporting estimation of a control system and estimation processing by the apparatus.

2. Description of the Related Art

The H-infinity control theory, µ synthesis theory, robust control theory, and the like are known as methods of designing a controller which controls a controlled system whose frequency characteristic varies from a manipulated variable to a controlled variable so as to make the controlled variable fall within a desired target value range.

Even with the use of the above theories, depending on required specifications such as robustness and control accuracy or the characteristics of a controlled system, a controller which satisfies all the specifications may not be available. In such a case, restrictions on required specifications are often eased to obtain a feasible controller. However, the controller obtained in this manner does not guarantee to have perfect robustness within the variation of a controlled system, and hence cannot sometimes guarantee target control accuracy with respect to the variation of the controlled system.

Demands have arisen for an estimation support apparatus for a control system, which estimates a robust control system without omission based on a designed controller within the variation range of a controlled system, checks whether stability or desired control accuracy can be obtained in the control system, and easily determines the necessity to change the design of the controller.

A control system which drives the photosensitive member of an image forming apparatus will be described as a concrete example. In an image forming apparatus including an intermediate transfer member, a developer moves from the photosensitive member surface to the intermediate transfer member surface at the contact portion between the photosensitive member and the intermediate transfer member.

In some case, in order to accurately rotate the photosensitive member or the intermediate transfer member at a predetermined rotational speed in consideration of image quality, feedback control is performed on a driving motor for the photosensitive member or the intermediate transfer member. A manipulated variable in a DC motor driving control system for the photosensitive member is a command value for motor driving, which is the duty value of a pulse width modulation (PWM) signal supplied to the motor. A controlled variable in the same control system is the rotational speed of the photosensitive member. That is, the controller computes a manipulated variable from the difference between the rotational speed of the photosensitive member detected by a sensor and a target rotational speed by proportional-integral-derivative (PID) control method, H-infinity control method, or the like.

Depending on the amount of developer or the operating environment, the photosensitive member and the intermediate transfer member slide or do not slide at the contact portion between them. That is, the transfer characteristic from a manipulated variable to a controlled variable greatly changes in the driving control system for the photosensitive member in accordance with sliding at the contact portion. When the photosensitive member and the intermediate transfer member do not slide, even if the speed of the photosensitive member is controlled, the reaction of a controlled variable to a manipulated variable is slow due to the influence of the intermediate transfer member. If they slide, the speed of the intermediate transfer member does not influence that of the photosensitive member, and the reaction of a controlled variable to a manipulated variable is quick.

In addition, in an actual operating environment, it is unknown how much sliding occurs at the contact portion. For this reason, it is necessary to construct a control system which allows the photosensitive member to stably rotate and accurately achieve a predetermined speed in any state from a state in which sliding does not occur to a state in which perfect sliding occurs (to be referred to as the state of the contact portion hereinafter). It is conceivable to use the H-infinity control theory or µ synthesis theory to design a control system requiring such robustness. However, depending on required specifications such as robustness and speed accuracy with respect to the state of the contact portion or the characteristics of the driving system such as a resonance frequency, no controller that satisfies all the specifications may be available.

For example, when using a controller which satisfies a speed accuracy specification at the sacrifice of robustness, it is necessary to estimate the behavior of rotation of the photosensitive member in the state of the contact portion which deviates from the design specifications. In contrast to this, when using a controller which satisfies the robustness requirement at the sacrifice of speed accuracy, it is necessary to estimate how much the speed accuracy requirement is not satisfied.

In these estimations, it is necessary to estimate a transfer characteristic which varies depending on the state of the contact portion without omission. If a characteristic of the driving control system for the photosensitive member matches a characteristic subjected to estimation omission, the control system may diverge, and the photosensitive member may stop rotating, rotate at a speed exceeding a target speed, or undergo large periodic speed variations.

A simulation apparatus (for example, Japanese Patent No. 3219245) is known as an estimation apparatus for the stability and control accuracy of a robust control system, which performs time-series control simulation upon formulation of a controlled system with a time-varying system transfer function, and inspects the behavior of a control system in the controlled system which varies. This apparatus can check the behavior of the robust control system without omission within the variation of the characteristic of the controlled system which can be formulated by a time-varying system.

However, the above technique can be applied only when the variation of a characteristic of a controlled system can be formulated by a time-varying transfer function. It is difficult to formulate all conditions with respect to complicated time-series variations and variations in characteristic due to individual differences between controlled systems which do not vary in a time-series manner and environments. The variation of a transfer characteristic due to the state of the contact portion in an image forming apparatus is an example of the variation of a characteristic, and hence it requires an enormous time for formulation in a controlled system having uncertainty in a frequency characteristic from a manipulated variable to a controlled variable.

As an estimation apparatus for a control system for a controlled system in which characteristic variations are difficult to formulate, MATLAB®, which is commercially available software, is known. This software performs Monte Carlo analysis upon randomly extracting characteristics from the characteristic variation range of a controlled system, and outputs a control system estimation diagram such as a Nyquist diagram for the control system. The user can determine the necessity to change the design of a controller by referring to the output results and checking the stability and control accuracy of a robust control system.

However, estimating the stability and control accuracy of the robust control system by Monte Carlo analysis may lead to estimation omission in the control system because characteristics are randomly extracted from the characteristic variation range of the controlled system.

SUMMARY OF THE INVENTION

In one aspect, an estimation apparatus for estimating a control system including a controller and a controlled system, the apparatus comprising: a first acquisition section, configured to acquire a frequency characteristic of the controller; a second acquisition section, configured to acquire a gain characteristic and phase characteristic of the controlled system; a computation section, configured to compute an open-loop transfer characteristic of the control system and a variation range of the open-loop transfer characteristic from a variation range of the frequency characteristic of the controlled system and the frequency characteristic of the controller, wherein the variation range of the frequency characteristic of the controlled system is a region where a variation range of the gain characteristic and a variation range of the phase characteristic overlap in a complex coordinate system; and an estimation section, configured to estimate stability of the control system from the open-loop transfer characteristic and the variation range of the open-loop transfer characteristic.

According to the aspect, it is possible to accurately estimate the stability of a control system including a controller and a controlled system having uncertainty in a frequency characteristic.

Further features of the present invention will become apparent from the following description of exemplary embodiments with reference to the attached drawings.

BRIEF DESCRIPTION OF THE DRAWINGS

FIG. 4 is a view showing an example of data representing a frequency characteristic.

FIG. 5 is a view showing an example of a gain characteristic and phase characteristic.

FIG. 10 is a view showing an example of the best and worst values of disturbance sensitivity.

DESCRIPTION OF THE EMBODIMENTS

Estimation processing for a control system according to an embodiment of the present invention will be described in detail below with reference to the accompanying drawings. The following will exemplify a case in which the present invention is applied to a driving control system for the photosensitive member of an image forming apparatus.

[Arrangement of Apparatus]

The arrangement of the estimation apparatus according to the embodiment will be described with reference to the block diagram of FIG. 1.

A microprocessor (CPU) 101 executes various kinds of programs including an operating system (OS) stored in nonvolatile memories such as a read only memory (ROM) 103 and a hard disk drive (HDD) 108 by using a random access memory (RAM) 102 as a work memory, and controls the arrangement (to be described later) via a system bus 107. The various kinds of programs stored in the HDD 108 include a program for estimation processing for a control system (to be described later).

A general-purpose interface (I/F) 104 is, for example, an interface for a serial bus such as a USB (Universal Serial Bus), to which an input device 111 such as a mouse, keyboard, memory card reader/writer, or removable disk drive is connected. A video card (VC) 105 is a video interface, to which a monitor 113 such as a liquid crystal display (LCD) is connected. A network interface card (NIC) 106 is a network interface to which a network 114 such as a local area network (LAN) is connected. The CPU 101 can exchange data with a server apparatus or the like on a network via the NIC 106.

The CPU 101 displays a user interface (UI) on the monitor 113. The user inputs instructions and data to the UI by operating the mouse or the keyboard. The CPU 101 receives user instructions and data, and performs various kinds of processing by executing programs in accordance with these inputs.

Figure 1:
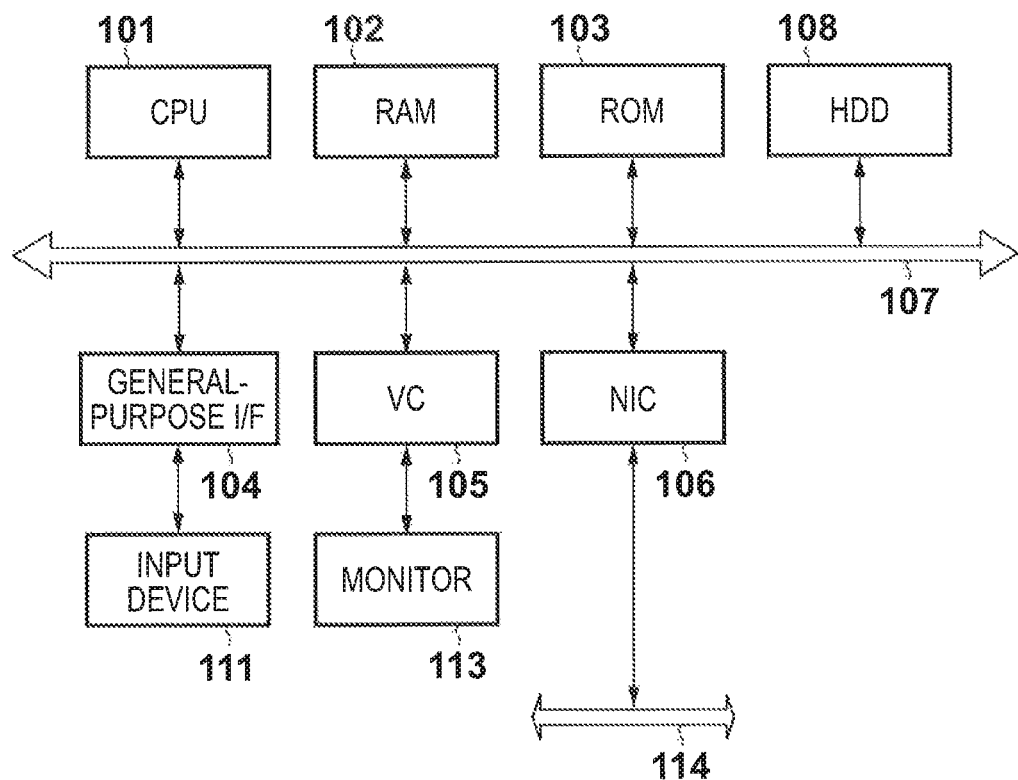
FIG. 1 is a block diagram for explaining the arrangement of an estimation apparatus according to an embodiment.

Note that it is possible to implement the estimation apparatus shown in FIG. 1 by supplying programs for estimation processing for a control system to a general-purpose computer.

[Functional Arrangement]

Figure 2:
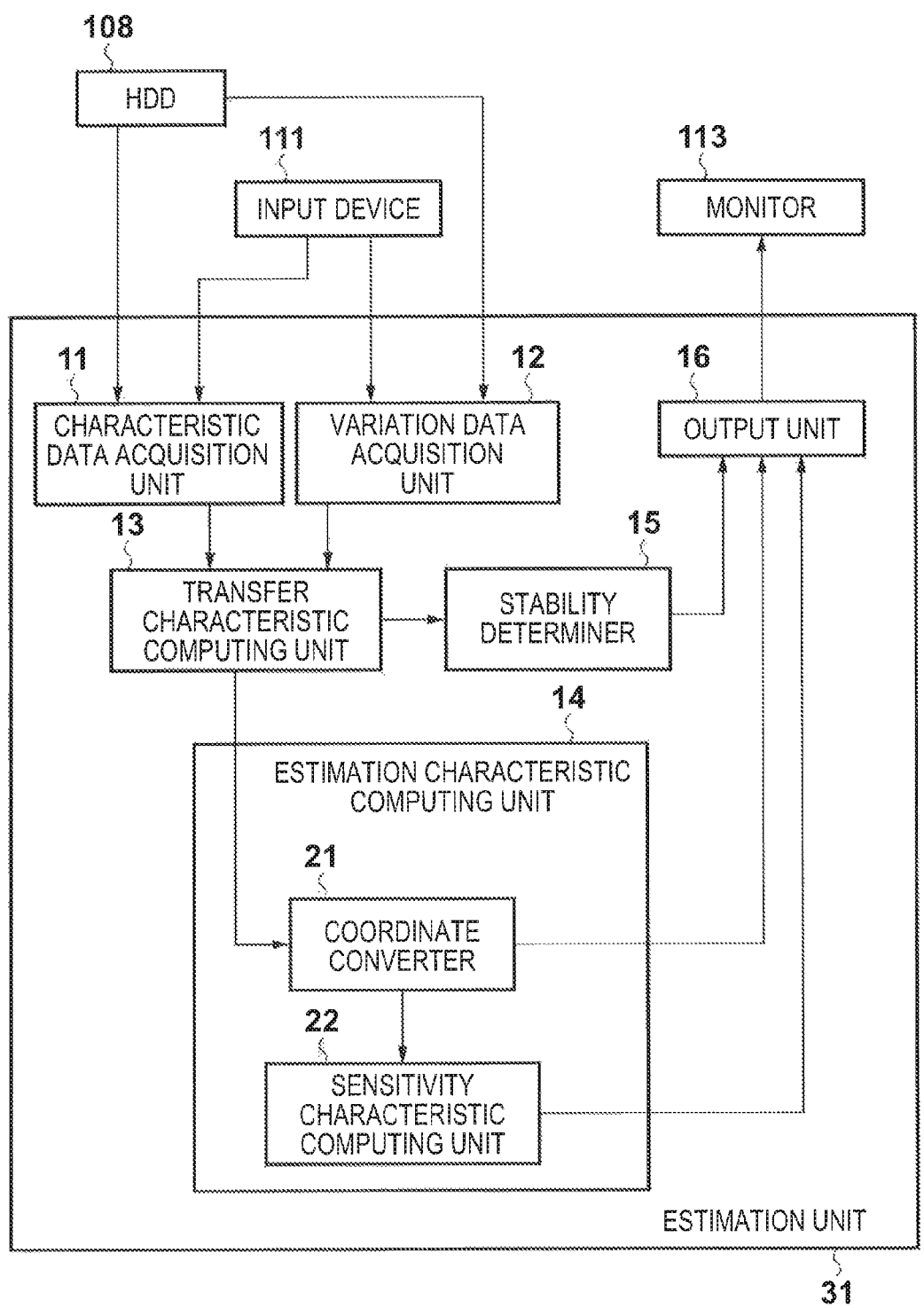
FIG. 2 is a block diagram for explaining the functional arrangement of the estimation apparatus according to the embodiment.

The functional arrangement of the estimation apparatus according to the embodiment will be described with reference to the block diagram of FIG. 2. An estimation unit 31 shown in FIG. 2 indicates a functional arrangement to be used when the CPU 101 performs estimation processing for the control system.

The estimation unit 31 displays the UI on the monitor 113 and receives an instruction input by the user via an input device 111. The estimation unit 31 acquires data designated by the user via the input device 111 or acquires the data from the HDD 108 or the server apparatus, and performs estimation processing for the control system. The estimation unit 31 then displays a graph and various kinds of information as estimation results on the UI. The user checks the stability or control accuracy of the robust control system by referring to the display of the UI, and determines the necessity to change the design of the controller.

A characteristic data acquisition unit 11 acquires data representing the frequency characteristic of the controller. A variation data acquisition unit 12 acquires data representing the gain characteristic and phase characteristic of a controlled system. Note that these data are acquired from the input device 111, HDD 108, server apparatus, and the like.

A transfer characteristic computing unit 13 sets, as the variation range of the frequency characteristic of the controlled system, a region where the gain variation range and phase variation range which are respectively represented by the gain characteristic and phase characteristic of the controlled system overlap in a complex coordinate system. The transfer characteristic computing unit 13 then computes the open-loop transfer characteristic of the control system and its variation range from the variation range of the frequency characteristic of the controlled system and the frequency characteristic of the controller.

An estimation characteristic computing unit 14 includes a coordinate converter 21 and a sensitivity characteristic computing unit 22. The coordinate converter 21 performs coordinate conversion of the variation range of an open-loop transfer characteristic into a complex coordinate system. The sensitivity characteristic computing unit 22 computes the distance from a point (−1+j0) to the variation range of open-loop transfer characteristic in the complex coordinate system, and obtains a variation range of disturbance sensitivity from a disturbance which causes a speed variation to a controlled variable.

A stability determiner 15 determines the stability of the control system in terms of open-loop transfer characteristic by using the idea of a Nyquist stability criterion, and outputs data indicating the stability determination result. An output unit 16 receives data respectively indicating the variation range of the open-loop transfer characteristic, the variation region of the disturbance sensitivity, and the stability determination result, and displays them on the UI on the monitor 113. Note that the output unit 16 can store the data in a storage medium, the HDD 108, the server apparatus, and the like.

[Estimation Processing for Control System]

Figure 3:
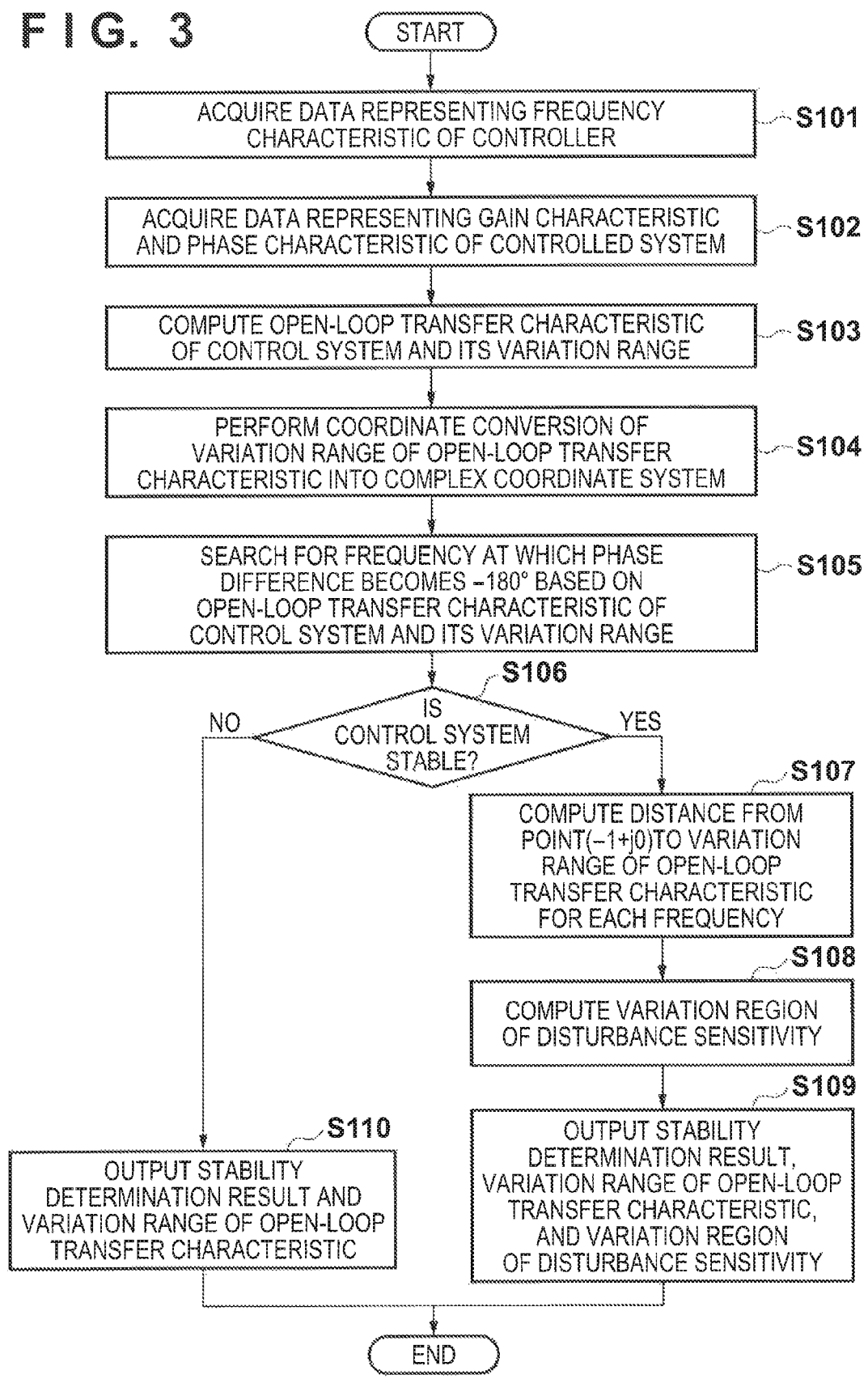
FIG. 3 is a flowchart for explaining estimation processing for a control system.

Estimation processing for the control system will be described with reference to the flowchart of FIG. 3.

The characteristic data acquisition unit 11 acquires data indicating the frequency characteristic of the controller (S101). The frequency characteristic of the controller indicates a transfer characteristic from the difference between the speed of the photosensitive member detected by the sensor and a target speed to the duty value of a pulse width modulation (PWM) signal supplied to the motor. FIG. 4 shows an example of data indicating a frequency characteristic. That is, the frequency characteristic represents a gain and phase difference corresponding to each frequency. Alternatively, the frequency characteristic of the controller may be provided as a transfer function. In this case, it is possible to compute a gain and phase difference corresponding to each frequency from the transfer function.

The variation data acquisition unit 12 then acquires data indicating the gain characteristic and phase characteristic of the controlled system (S102). The gain characteristic and phase characteristic of the controlled system represent a transfer function from the duty value of a PWM signal supplied to the motor to the speed of the photosensitive member. FIG. 5 shows an example of the gain characteristic and phase characteristic. That is, the gain characteristic and the phase characteristic respectively represent the gain variation range and phase difference variation range corresponding to each frequency.

FIG. 5 shows an example of representing the maximum and minimum values of gain and the maximum and minimum values of phase difference as variation ranges. That is, depending on the state of the contact portion between the photosensitive member and the intermediate transfer member, the gain varies within the range of maximum and minimum values and the phase difference varies within the range of maximum and minimum values at each frequency. In this case, that "the phase difference is large" is defined as being large in the positive direction.

In addition, a variation range may be defined by a center value and a variation width. In this case, computing the center value±the variation width will obtain the maximum and minimum values. Furthermore, if a variation range is given as two transfer functions representing characteristic variations, it is possible to compute the maximum and minimum values corresponding to each frequency from the transfer functions.

The transfer characteristic computing unit 13 then computes the open-loop transfer characteristic of the control system and its variation range (S103). A manner of obtaining the variation range of frequency characteristic of the controlled system will be described first with reference to FIG. 6.

Figures 6, 7:
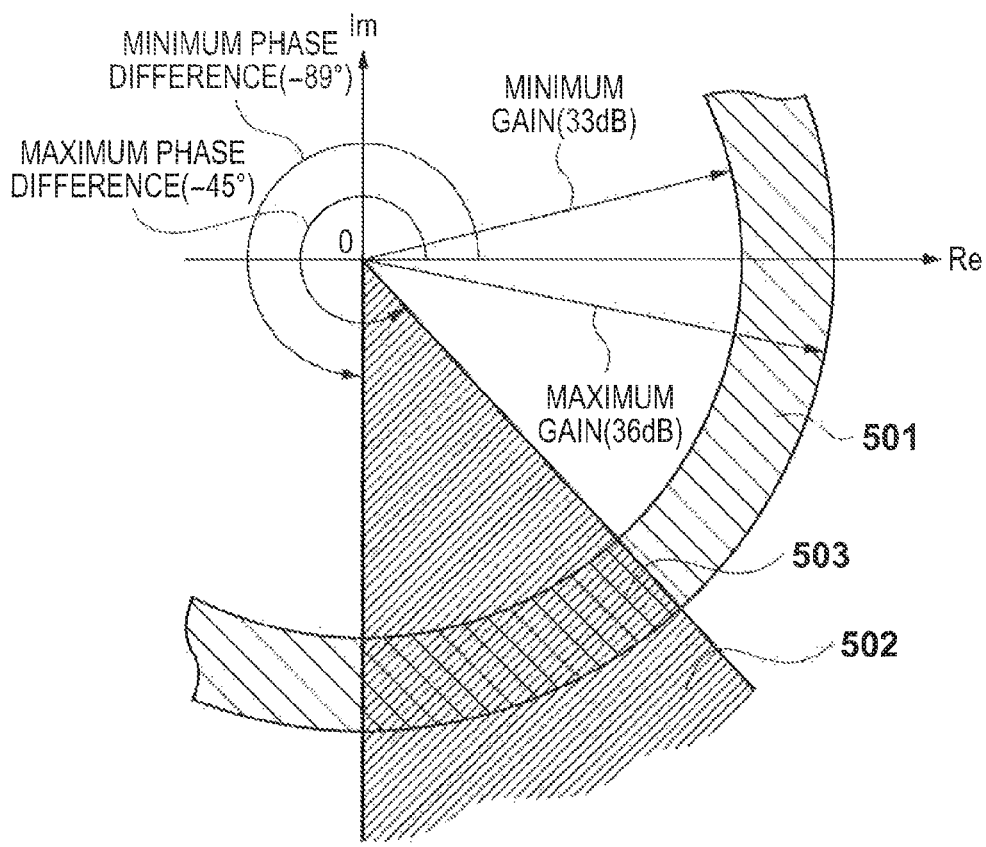
FIG. 6 is a view for explaining a manner of obtaining the variation range of the frequency characteristic of a controlled system.
FIG. 7 is a view showing an example of an open-loop transfer characteristic.

FIG. 6 shows a state in which the gain variation range and phase difference variation range of the controlled system at 7 Hz as shown in FIG. 5 are converted into a complex coordinate system. In the complex coordinate system, a gain is represented by a distance from the origin, and a phase difference is represented by an angle with the real (Re) axis in the positive direction being 0° and the counterclockwise direction being the positive direction. The gain variation range at 7 Hz is represented as a region 501 sandwiched between a circle corresponding to a maximum value of 36 dB and a circle corresponding to a minimum value of 33 dB. The phase difference variation range at 7 Hz is represented as a region 502 sandwiched between a half line from the origin corresponding to a maximum value of −45° and a half line from the origin corresponding to a minimum value of −89°. The transfer characteristic computing unit 13 sets a region 503 where the regions 501 and 502 overlap as the variation range of the frequency characteristic of the controlled system.

The processing of computing an open-loop transfer characteristic and its variation range from the variation range of the frequency characteristic of the controlled system and the frequency characteristic of the controller will be described next.

When a gain is expressed in decibel, the gain of the open-loop transfer characteristic at a predetermined frequency is computed as the sum of the gain of the controller at the frequency and the gain of the controlled system at the frequency. The phase difference of the open-loop transfer characteristic at a predetermined frequency is computed as the sum of the phase difference of the controller at the frequency and the phase difference of the controlled system at the frequency. That is, when the frequency characteristic of the controlled system varies, it is possible to obtain the gain variation range of the open-loop transfer characteristic from the sum of the gain variation range of the controlled system and the gain of the controller. In addition, it is possible to obtain the phase difference variation range of the open-loop transfer characteristic from the sum of the phase difference variation range of the controlled system and the phase difference of the controller.

FIG. 7 shows an example of an open-loop transfer characteristic. It is possible to obtain an open-loop transfer characteristic without omission and estimate a robust control system without omission by setting a region where the gain variation range and phase difference variation range of the controlled system overlap in the complex coordinate system as the variation range of the frequency characteristic of the controlled system.

The coordinate converter 21 then performs coordinate conversion of the variation range of the open-loop transfer characteristic into a complex coordinate system (S104). The stability determiner 15 searches for a frequency at which the phase difference is −180° based on the open-loop transfer characteristic of the control system and its variation range (S105), and determines the stability of the control system based on the search result (S106).

The stability determiner 15 searches the data indicating the open-loop transfer characteristic and its variation range for data including −180 in the phase difference variation range and data with a phase difference of −180° between adjacent data (frequencies). In the data shown in FIG. 7, the data detected by this search has a value of "1" in the search result field. The data at frequencies of 1 Hz, 2 Hz, and 3 Hz include −180° in the phase difference variation ranges, and the data at a frequency of 50 Hz exhibits a phase difference of −180° between itself and the adjacent data at 70 Hz.

The stability determiner 15 then determines whether there is data satisfying the following two conditions. It is known that a control system including data satisfying either of the two conditions becomes unstable.

The first condition: There is a frequency at which the gain is 0 dB and the phase difference is −180° within the variation range. In a control system having such an open-loop transfer characteristic, an open-loop transfer characteristic having a frequency at which the gain is 0 dB and the phase difference is −180° depending on the state of the contact portion between the photosensitive member and the intermediate transfer member. Such an open-loop transfer characteristic may make the control system unstable.

The second condition: All the phase differences between frequencies exhibiting a phase difference of −180° are smaller than −180° within the variation ranges and the gain between frequencies exhibiting a phase difference of −180° passes through 0 db. In this case, it is known that, in the Nyquist stability criterion, the vector locus of the open-loop transfer characteristic rotates with the point (−1+j0) in the complex coordinate system being seen on the right, and the control system becomes unstable.

Consider the data shown in FIG. 7. Although the phase difference becomes −180° at 1 Hz, 2 Hz, and 3 Hz, the gain does not become 0 dB at any frequency. In addition, although the phase difference becomes −180° at a frequency between 50 Hz and 70 Hz, the gain at the frequency is predicted not to become 0 dB from the gains at 50 Hz, and 70 Hz. Therefore, the data shown in FIG. 7 include no data which satisfies the first condition.

In addition, the gain is predicted not to pass through 0 dB between 1 Hz and 2 Hz and between 2 Hz and 3 Hz. On the other hand, the gain passes through 0 dB between 3 Hz and 70 Hz, but the phase difference is larger than −180°. Therefore, the data shown in FIG. 7 include no data which satisfies the second condition.

That is, the stability determiner 15 determines that the control system having the open-loop transfer characteristic shown in FIG. 7 is stable. Applying the idea of the Nyquist stability criterion to the open-loop transfer characteristic of a control system in this manner can determine the stability of a robust control system.

When the stability determiner 15 determines that the control system is stable, the sensitivity characteristic computing unit 22 computes the distance from the point (−1+j0) to the variation range of the open-loop transfer characteristic for each frequency in the complex coordinate system (S107). The sensitivity characteristic computing unit 22 then computes the variation region of the disturbance sensitivity from a disturbance that causes a speed variation to a controlled variable (S108).

As the value of disturbance sensitivity increases, the disturbance amplitude increases. This appears in a controlled variable. As the value of disturbance sensitivity decreases, the disturbance amplitude decreases. This appears in a controlled variable. That is, the smaller the value of disturbance sensitivity, the higher the restricting force exerted by the control system on the disturbance. This can improve the control accuracy (the accuracy of the speed of the photosensitive member).

Figures 8, 9:
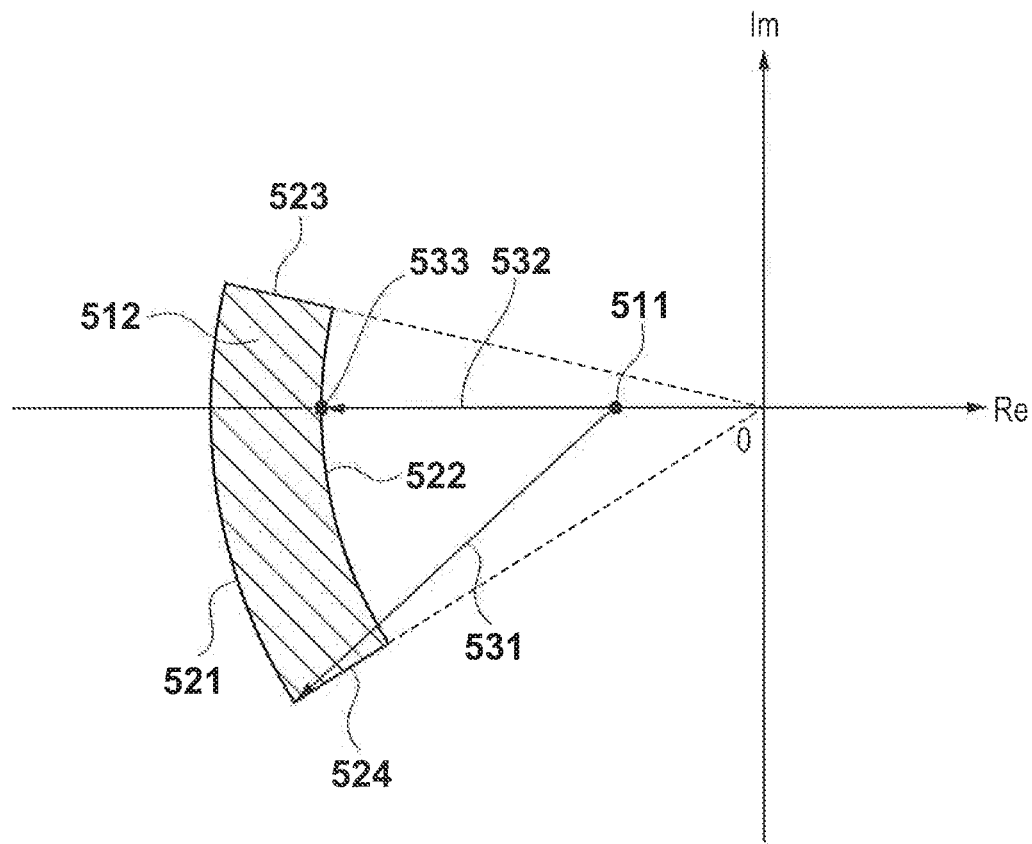
FIG. 8 is a view for explaining the distance from a point (−1+j0) to the variation range of an open-loop transfer characteristic.
FIG. 9 is a view showing an example of longest distance data and shortest distance data.

The distance from the point (−1+j0) to the variation range of an open-loop transfer characteristic will be described with reference to FIG. 8. The sensitivity characteristic computing unit 22 computes the longest distance and the shortest distance from the point (−1+j0) to the variation range of the open-loop transfer characteristic. Referring to FIG. 8, a point 511 corresponds to the point (−1+j0), and a region 512 corresponds to the variation range of the open-loop transfer characteristic. Boundary lines 521, 522, 523, and 524 surrounding the region 512 respectively correspond to the maximum value of the gain, the minimum value of the gain, the maximum value of the phase difference, and the minimum value of the phase difference.

If the point 511 is included in the region 512, the stability determiner 15 determines that the control system is unstable, and hence the apparatus does not execute the processing in step S107. In other words, if the control system is stable, the region 512 does not include the point 511. Therefore, a point corresponding to the longest distance from the point 511 to the region 512 is located on the boundary line 521, and a point corresponding to the shortest distance from the point 511 to the region 512 is located on the boundary line 522. Assume that in the case shown in FIG. 8, a line segment 531 connecting the point 511 to the lower end of the boundary line 521 is the longest, and the length of the line segment 531 is regarded as the longest distance, whereas a line segment 532 connecting the point 511 to an intersection point 533 between the boundary line 522 and the real (Re) axis is the shortest, and the length of the line segment 532 is regarded as the shortest distance. FIG. 9 shows an example of long distance data and short distance data.

The disturbance sensitivity from a disturbance to a controlled variable is computed as the reciprocal of the distance from the point 511 to the open-loop transfer characteristic. Therefore, the sensitivity characteristic computing unit 22 obtains the variation region of the disturbance sensitivity in which the reciprocal of the longest distance from the point 511 to the variation range of the open-loop transfer characteristic is regarded as the best value of the disturbance sensitivity, and the reciprocal of the shortest distance is regarded as the worst value of the disturbance sensitivity. FIG. 10 shows an example of the best and worst values of the disturbance sensitivity.

If the stability determiner 15 determines that the control system is stable, the output unit 16 receives the stability determination result from the stability determiner 15, the variation range of the open-loop transfer characteristic from the coordinate converter 21, and the variation range of the disturbance sensitivity from the sensitivity characteristic computing unit 22, and outputs them (S109).

Figure 11:
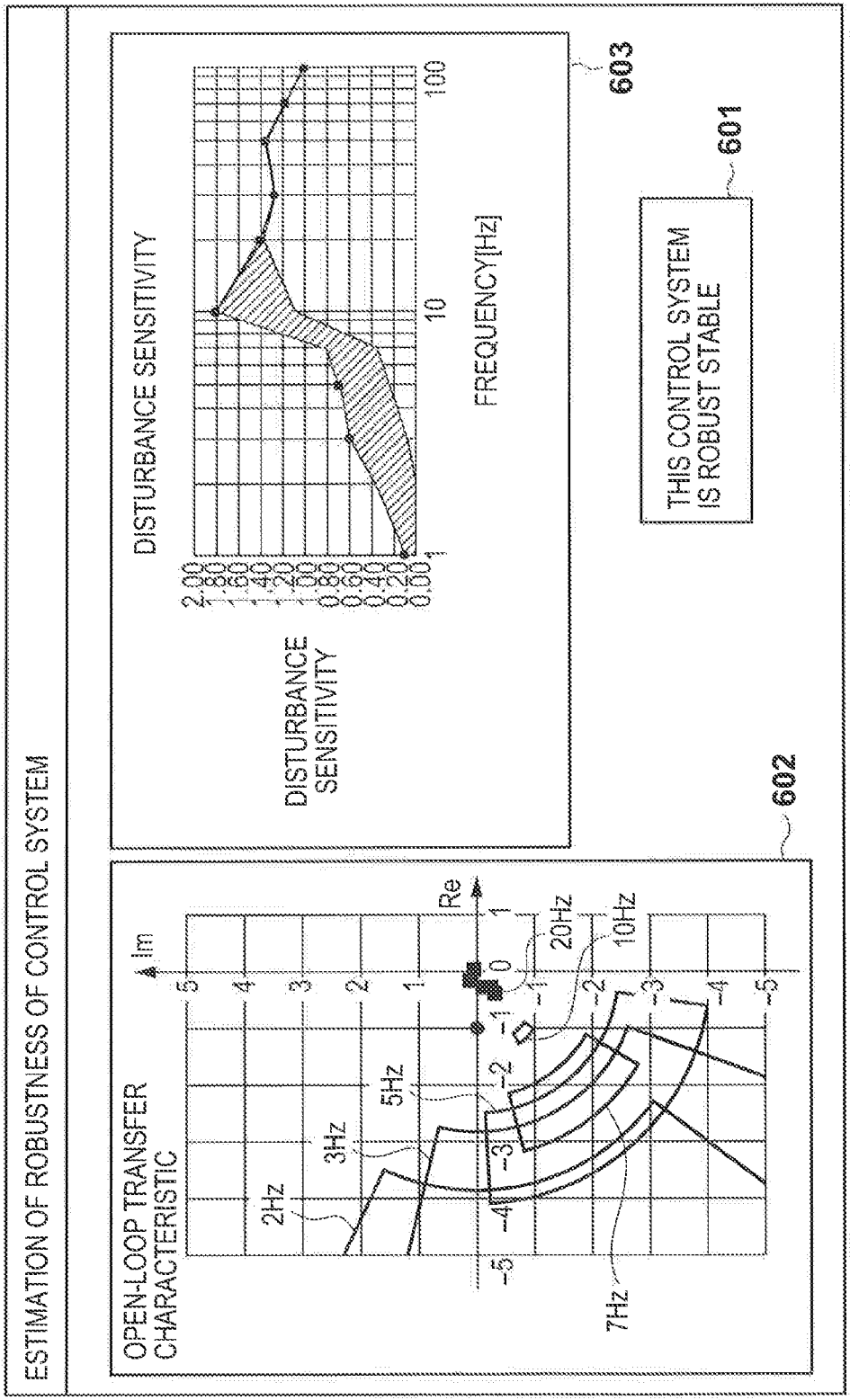
FIG. 11 is a view showing an example of an output from an output unit when it is determined that a control system is stable.

FIG. 11 shows an example of an output from the output unit 16 when the stability determiner 15 has determined that the control system is stable. FIG. 11 shows, on the monitor 113, an example of a UI which displays a stability determination result as a character string 601 and also displays the variation range of the open-loop transfer characteristic and the variation range of the disturbance sensitivity at each frequency as graphs 602 and 603, respectively.

On the other hand, if the stability determiner 15 determines that the control system is unstable, the output unit 16 receives the stability determination result from the stability determiner 15 and the variation range of the open-loop transfer characteristic from the coordinate converter 21 and outputs them (S110).

Figure 12:
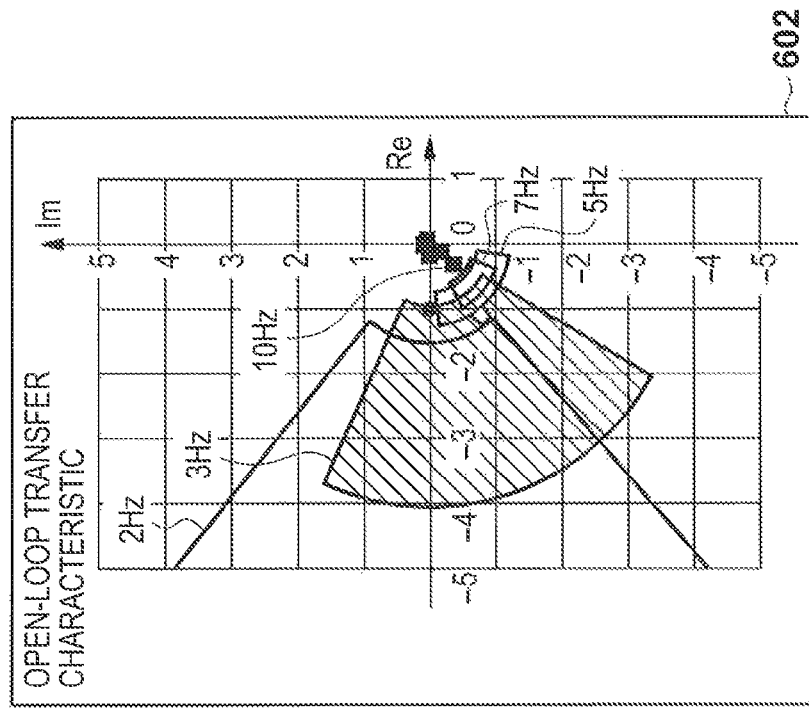
FIG. 12 is a view showing an example of an output from an output unit when it is determined that a control system is unstable.

FIG. 12 shows an example of an output from the output unit 16 when the stability determiner 15 determines that determined that the control system is unstable. FIG. 12 shows, on the monitor 113, the stability determination result as a character string 601 and also displays the variation range of the open-loop transfer characteristic at each frequency as a graph 602.

Referring to the UI shown in FIG. 11 allows the user to know from the display 601 that the control system is stable. In the display 602, the variation range of the open-loop transfer characteristic does not include the point (−1+j0) and rotates with the point being seen on the left, and hence the user determines that the control system is sufficiently stable. The user further refers to the display 603 to determine the necessity to change the design of the controller in consideration of the variation region of the disturbance sensitivity. If, for example, the disturbance sensitivity desired by the user is 1.5, the maximum value of the disturbance sensitivity at 10 Hz is 1.78, and hence it is necessary to change the design of the controller. That is, the design of the controller is changed to obtain the desired disturbance sensitivity by, for example, decreasing the gain at 10 Hz.

In addition, the user refers to the UI shown in FIG. 12 to know from the display 601 that the control system is unstable. The user then refers to the display 602 to understand that it is determined that the control system is unstable, because the variation range of the open-loop transfer characteristic at 3 Hz includes the point (−1+j0). Therefore, the user changes the design of the control system by, for example, increasing the gain of the controller at 3 Hz.

Displaying the variation range of the open-loop transfer characteristic at each frequency in the form of a graph while displaying the stability determination result allows the user to easily comprehend a cause for the instability of the control system. When the control system is stable, displaying the variation region of the disturbance sensitivity at each frequency in the form of a graph allows the user to easily comprehend the stability of the control system with respect to disturbances. These pieces of information allow the user to properly determine the necessity to change the design of the controller.

In addition, displaying the open-loop transfer characteristic for each frequency makes it possible for the user to comprehend a frequency band lacking in control accuracy or an unstable frequency band. Furthermore, displaying the disturbance sensitivity for each frequency makes it possible for the user to estimate the disturbance sensitivity of the control system without omission. For example, the user can determine whether desired control accuracy is obtained or in which frequency band desired control accuracy cannot be obtained. The user can construct a control system which can obtain desired control accuracy by comprehending a frequency band to be noted and increasing the restricting force on speed variation when changing the design of the controller.

As described above, according to estimation processing for the control system of the estimation apparatus according to this embodiment, it is possible to estimate the stability of a robust control system without omission. As a result, the user can accurately and easily determine the necessity to change the design of the controller. This makes it possible to construct a control system which can obtain desired control accuracy while securing stability in an operating environment.

Although the estimation apparatus for a control system in driving control on the photosensitive member of an image forming apparatus has been described above, this embodiment can be applied to other driving control systems for image forming apparatuses and temperature control systems in plants. In addition, if the transfer characteristic of a controlled system undergoes time-series variations due to aged deterioration, this embodiment can be applied to the control system by converting the variations into the gains and phase differences of the frequency characteristic.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-093511, filed Apr. 19, 2011, which is hereby incorporated by reference herein in its entirety.

What is claimed is:

1. An estimation apparatus for estimating a control system including a controller and a controlled system, the apparatus comprising:
   a first acquisition section configured to acquire a frequency characteristic of the controller;
   a second acquisition section configured to acquire a gain characteristic and a phase characteristic of the controlled system;
   a computation section configured to compute an open-loop transfer characteristic of the control system and a variation range of the open-loop transfer characteristic from a variation range of a frequency characteristic of the controlled system and the frequency characteristic of the controller, wherein the variation range of the frequency characteristic of the controlled system is a region where a variation range of the gain characteristic and a variation range of the phase characteristic overlap in a complex coordinate system; and
   an estimation section configured to estimate stability of the control system from the open-loop transfer characteristic and the variation range of the open-loop transfer characteristic,
   wherein the estimation section comprises:
     a converter configured to perform coordinate conversion of the variation range of the open-loop transfer characteristic into the complex coordinate system;
     a determiner configured to determine stability of the control system from the open-loop transfer characteristic and the variation range of the open-loop transfer characteristic; and
     an output section configured to output the variation range of the open-loop transfer characteristic having undergone the coordinate conversion into the complex coordinate system and a determination result on the stability, and wherein at least one of the first and second acquisition sections, the computation section, and the estimation section is implemented using a processor.

2. The apparatus according to claim 1, wherein the estimation section further comprises a computing section configured to compute a variation region of disturbance sensitivity from the variation range of the open-loop transfer characteristic having undergone the coordinate conversion into the complex coordinate system when the determiner determines that the control system is stable, and wherein the output section outputs the variation region of the disturbance sensitivity.

3. The apparatus according to claim 2, wherein the computing section computes a maximum value and minimum value of a distance between a point (−1+j0) in the complex coordinate system and the variation range of the open-loop transfer characteristic having undergone the coordinate conversion into the complex coordinate system, and sets reciprocals of the maximum value and minimum value as a variation region of the disturbance sensitivity.

4. The apparatus according to claim 1, wherein the determiner determines stability of the control system by a Nyquist stability criterion.

5. A method of estimating a control system including a controller and a controlled system, the method comprising:
using a processor to perform steps of:
acquiring a frequency characteristic of the controller;
acquiring a gain characteristic and a phase characteristic of the controlled system;
computing an open-loop transfer characteristic of the control system and a variation range of the open-loop transfer characteristic from a variation range of the frequency characteristic of the controlled system and the frequency characteristic of the controller, wherein the variation range of a frequency characteristic of the controlled system is a region where a variation range of the gain characteristic and a variation range of the phase characteristic overlap in a complex coordinate system; and
estimating stability of the control system from the open-loop transfer characteristic and the variation range of the open-loop transfer characteristic,
wherein the estimating step comprises:
performing coordinate conversion of the variation range of the open-loop transfer characteristic into the complex coordinate system;
determining stability of the control system from the open-loop transfer characteristic and the variation range of the open-loop transfer characteristic; and
outputting the variation range of the open-loop transfer characteristic having undergone the coordinate conversion into the complex coordinate system and a determination result on the stability.

6. A non-transitory computer readable medium storing a computer-executable program for causing a computer to perform a method of estimating a control system including a controller and a controlled system, the method comprising:
acquiring a frequency characteristic of the controller;
acquiring a gain characteristic and a phase characteristic of the controlled system;
computing an open-loop transfer characteristic of the control system and a variation range of the open-loop transfer characteristic from a variation range of the frequency characteristic of the controlled system and the frequency characteristic of the controller, wherein the variation range of a frequency characteristic of the controlled system is a region where a variation range of the gain characteristic and a variation range of the phase characteristic overlap in a complex coordinate system; and
estimating stability of the control system from the open-loop transfer characteristic and the variation range of the open-loop transfer characteristic,
wherein the estimating step comprises:
performing coordinate conversion of the variation range of the open-loop transfer characteristic into the complex coordinate system;
determining stability of the control system from the open-loop transfer characteristic and the variation range of the open-loop transfer characteristic; and
outputting the variation range of the open-loop transfer characteristic having undergone the coordinate conversion into the complex coordinate system and a determination result on the stability.

7. An estimation apparatus for estimating a control system including a controller and a controlled system, the apparatus comprising:
a first acquisition section configured to acquire a frequency characteristic of the controller;
a second acquisition section configured to acquire a gain characteristic and a phase characteristic of the controlled system;
a computation section configured to compute an open-loop transfer characteristic of the control system and a variation range of the open-loop transfer characteristic from a variation range of a frequency characteristic of the controlled system and the frequency characteristic of the controller, wherein the variation range of the frequency characteristic of the controlled system is a region where a variation range of the gain characteristic and a variation range of the phase characteristic overlap in a complex coordinate system; and
an estimation section configured to estimate stability of the control system from the open-loop transfer characteristic and the variation range of the open-loop transfer characteristic,
wherein, in the complex coordinate system, the variation range of the frequency characteristic of the controlled system is a region surrounded by (a) a circle which has a radius corresponding to a maximum value of a gain and has a center at an origin of the complex coordinate system, (b) a circle which has a radius corresponding to a minimum value of the gain and has a center at the origin, (c) a half line which is extended from the origin and has a positive direction angle from a real axis of the complex coordinate system corresponding to a maximum value of a phase, and (d) a half line which is extended from the origin and has a positive direction angle from the real axis corresponding to a minimum value of the phase, and
wherein at least one of the first and second acquisition sections, the computation section, and the estimation section is implemented using a processor.

* * * * *